Feb. 13, 1940.　　G. A. TINNERMAN　　2,190,577
CONNECTION FOR KNOBS AND THE LIKE
Filed Dec. 1, 1938
Fig. 1.
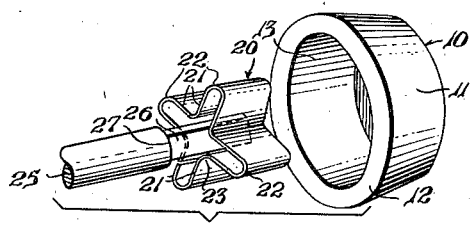
Fig. 2.
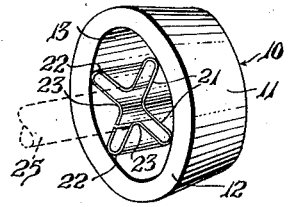
Fig. 3.
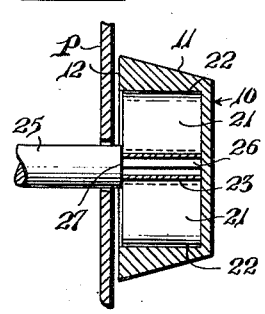
Fig. 4.
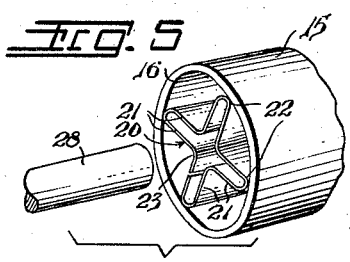
Fig. 5.
Fig. 6.
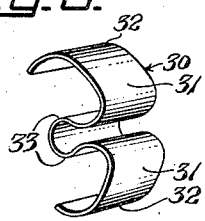
Fig. 7.
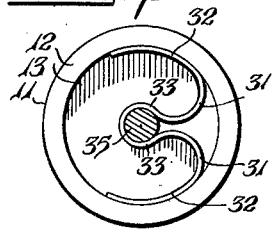
Fig. 8.
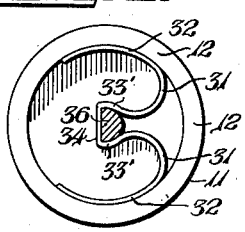
Fig. 9.
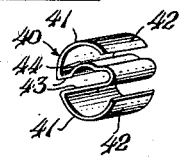
Fig. 10.
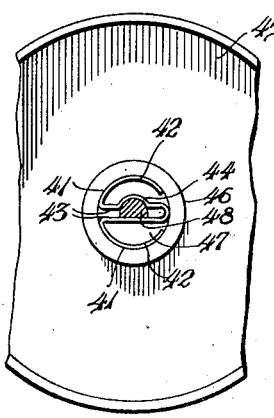
Fig. 11
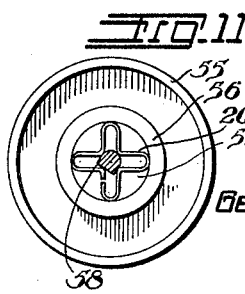
Inventor:
GEORGE A. TINNERMAN
H. G. Lombard,
Attorney Patented Feb. 13, 1940

2,190,577

UNITED STATES PATENT OFFICE 2,190,577

CONNECTION FOR KNOBS AND THE LIKE

George A. Tinnerman, Rocky River, Ohio, assignor to Albert H. Tinnerman, Cleveland, Ohio Application December 1, 1938, Serial No. 243,436

9 Claims. (Cl. 287—53)

This invention deals with improved connections for securing a knob, handle or other article of manufacture to a cooperating shaft, rod, spindle or the like in fixedly held position against relative rotative as well as relative axial movement for use in effecting axial thrust-like operations or for the purpose of transmitting or receiving a relatively small torque without resulting in objectionable looseness, wobble, and side play in the connection.

More particularly, the present invention is directed to improved connections for detachably securing an operating member or similar article of manufacture to a shaft or stem employed, for example, as the operating member for an adjustable control unit. A preferred form of such operating member usually is provided in the manner of a one-piece substantial knob or handle device constructed of hardened plastic material such as Bakelite, Tenite, Plaskon, synthetic rubber compositions, Celluloid, etc. In attaching such articles to shaft stems, rods and spindles and the like, it has been the recent practice to provide a socket opening in a central hub provided on the plastic part and fit an end of the shaft into such socket opening together with expedient anchoring means for retaining the knob and shaft stem against relative movement; and to this end various anchoring or retaining means such as set screws, spring friction and clutch devices and the like have been employed which in any form exert a binding or wedging action beween the shaft and inner side walls of the socket opening in the hub.

The plastic composition of the connecting hub on such plastic parts is fragile and quite brittle and when thus provided with a socket opening receiving the shaft together with anchoring means exerting a more or less localized binding or wedging action between the shaft and the adjacent inner side wall of the socket opening, there frequently occurs a splitting or fracture of the connecting hub in the application of the shaft stem thereto or incident to strain taking place after a period of use with the result that even though the knob is not completely broken, it is so loosely fitted to the shaft that it is practically useless and must be replaced anyway.

A primary object of the present invention therefore is to provide an improved form of connection which overcomes all the insufficiencies of the prior art structures in the use of a spring holding clip device so designed as to serve as the means for securing a knob, handle or other article of manufacture directly to a shaft or the like against relative rotative as well as relative axial movement.

A further object of the invention is to provide simple and easily installed means for connecting a knob or other part to a shaft, said means comprising a spring holding clip rigidly engaged in a recess in such part and otherwise designed to provide a socket opening for receiving the shaft in such manner as to take the entire thrust incident to strain in the connection as on turning movements of the knob, wherefore possibility of splitting or breaking of the knob or other part is minimized and practically eliminated.

Still another object of the invention contemplates the provision of an improved means for connecting an operating member or like part to a shaft, said means comprising a simple inexpensive form of spring holding clip employed with the operating member in such manner as to eliminate entirely the use of special connecting hub elements heretofore employed in mounting such operating members and which of course, required special mold forms and other expensive molding equipment.

A further object is for a connection comprising a spring holding clip which may be provided at very low cost and adapted to effectively connect a relatively large member to a shaft or shaft stem of considerably smaller cross-section, said clip being so designed as to provide central bearing surfaces presenting a socket opening into which the shaft is easily and quickly assembled and readily detached without the use of tools, and which connection is highly efficient at all times and not subject to looseness, side play or wobble of any nature.

Another principal purpose of the invention is to provide a means for connecting a knob or like part to a shaft by an improved construction in which neither the knob nor the shaft is weakened and separate, automatic spring clip retaining means is applied to a recess in the knob or other part in such manner as to provide a socket opening receiving the shaft and otherwise provide a connection under continuously effective spring tension whereby the knob is secured to the shaft against relative movements.

A more specific object contemplates the provision of such means for connecting a part to a shaft stem having a flat side face and designed for abutting relation with bearing surfaces of the socket opening presented by the spring holding clip in providing connection in which the part secured is held against relative rotative as well as relative axial movement.

Still another object is to provide such connecting means in an arrangement comprising a recessed connecting hub provided on the object to be secured, the spring holding clip being designed to engage at a plurality of points around the inner side wall of the connecting hub recess to minimize possibility of splitting thereof under strain and including bearing surfaces presenting a socket opening for receiving the shaft in connected engagement therewith.

Further objects and advantages, and other new and useful features in the construction, arrangement and general combination of parts of the invention, will be readily apparent to those skilled in the art as a description thereof proceeds with reference to the accompanying drawing in which like reference characters designate like parts throughout the same, and in which:

Fig. 1 is a perspective view showing the details of construction of the component parts in a preferred embodiment of the improved connecting means of the invention;

Fig. 2 is a similar view showing the component parts of the connecting means as assembled, the shaft being represented by dotted lines;

Fig. 3 is a view looking to the underside of a knob or the like having a spring holding clip assembled therein for connecting thereto a shaft shown in section;

Fig. 4 is a sectional view of the knob assembly of Fig. 3 taken along line 4—4, looking in the direction of the arrows, and showing the assembly as employed in a panel knob installation;

Fig. 5 is a perspective of a further embodiment of this form of the connecting means showing the several parts as provided for securing the extremity of a shaft to one end of a solid article of manufacture such as a piston-like plunger or the like;

Fig. 6 is a perspective of another form of spring holding clip per se employed in a further embodiment of the invention;

Fig. 7 is a view looking to the underside of a knob assembly showing the application and use of the spring holding clip shown in Fig. 6 for providing a socket opening for receiving a substantially round shaft, shown in section;

Fig. 8 is a similar view showing the spring holding clip in this embodiment of the invention as modified to provide a substantially D-shaped socket opening for receiving a correspondingly shaped shaft, shown in section;

Fig. 9 is a perspective of a further form of spring holding clip employed in still another embodiment of the invention;

Fig. 10 shows the spring holding clip of Fig. 9 as assembled in a recess provided by a connecting hub on the underface of a relatively large object and presenting a socket opening for receiving a shaft considerably smaller in size, said shaft being shown in section; and, Fig. 11 shows a connecting means of the type represented in Fig. 10 as embodied in an installation for a knob or the like provided with a recessed connecting hub on the underface thereof and employing a spring holding clip of the form shown in Fig. 3.

It will be understood that the connecting means of the present invention is one of general utility and that the primary object contemplates the provision of a simple, inexpensive fastening construction which may be readily embodied in practically any installation wherein a knob, handle or other article of manufacture is detachably secured to a shaft, rod, spindle or the like.

Generally the principal improvement of the present invention resides in the arrangement whereby a relatively large knob, handle or other part may be provided at very low cost, with an improved connecting means for securing the same to a shaft, rod or stem of considerably smaller cross-section; thus, the improved construction contemplates the use of a spring holding clip designed to frictionally engage at a plurality of points in a simple recess provided in such part and including bearing surfaces presenting a socket opening for receiving the shaft and taking the entire thrust incident to strain set up in the connection upon turning movements and the like. At the same time the knob, handle or other part to be secured need be provided only in the manner of a simple, hollow, one piece device having a simple form of recess, preferably of cylindrical configuration; and this of course greatly facilitates the quantity production of a high grade article at minimum cost inasmuch as the only simplest molding equipment is required.

Moreover, the instant connecting means in any embodiment requires only the use of a simple, inexpensive, spring holding clip which is entirely concealed from view in a completed installation and otherwise eliminates expensive and time consuming drilling, tapping and broaching operations heretofore necessary in producing similar articles in addition to dispensing with the use of set screws and special forms of spring friction and clutch devices for exerting a binding or wedging action on the shaft. In this respect, it is to be recognized that the improved construction of the present invention involves a decided advantage over heretofore known devices in that the spring holding clip is designed to engage at various points in a recess provided in the part to be secured and otherwise present a socket opening frictionally and grippingly engaging the shaft in such manner as to take substantially the entire thrust and strain transmitted by the shaft in turning movements and other operations. Thus there is no localized pressure on any portion of the side wall recess as would cause a splitting or breaking of the plastic knob or other article of manufacture mounted on the shaft either at the time of the initial attachment thereof or after a period of use in an installation.

In the accompanying drawing, the invention is shown with reference to knob or handle members such as may be employed as panel knobs on radio sets, control members and similar devices on automobile and aeroplane instrument panels, or the valve handles on stove burner units and the like; it is to be understood however that the improved connecting means is not limited to the types of devices herein illustrated and described since it is quite obvious that the invention is equally adaptable to use as the means for securing, mounting or connecting various other articles of manufacture to shafts, rods, spindles and the like.

In the embodiment of the invention represented in Figs. 1-4 inclusive, there is shown by way of illustration, an application of the improved connecting means as employed in a panel knob arrangement for an instrument control shaft of a radio apparatus, for example. The knob designated generally 10, Figs. 1 and 2, is formed of any suitable material, preferably a plastic composition molded into a compact, one piece device of any selected size or shape. Usually the knob is substantially annular in outward appearance and generally cup-shaped in section to provide an imperforate body 11 and if desired, a peripheral flange on which may be formed dial graduations, pointers, symbols, and similar indicating means in a well known manner.

It is often necessary or desirable that the imperforate body 11 have extraordinary strength in the area of the open end thereof to guard against splitting or cracking of the knob body under the expansive force of the spring holding clip assembled in the recess provided therein. To this end, as best seen in section, Fig. 4, the knob may be formed with an outward taper in the manner of a substantial cone shape presenting an enlarged peripheral skirt 12 which is of such strength as to eliminate any possibility of splitting or cracking of the knob body.

In any event, the knob, handle or other article of manufacture of any selected size and shape is provided with a recess 13 which of course may be of any suitable cross-section but is preferably cylindrical inasmuch as the molding equipment required therefor is the simplest and least expensive, and such recess if necessary may be provided in any article of manufacture by an expedient boring or drilling operation.

A further advantage of this construction resides in the fact that the knob, handle or other article of manufacture may be provided in the form of a simple, hollow one-piece device such that in quantity production, a considerable saving is obtained in the amount of plastic material required and other costs of manufacture. At the same time, the use of connecting hub elements may be dispensed with entirely together with the objectionable tendency of such connecting hubs to split or crack from their foundations either in the initial attachment of the shaft thereto or incident to strain after a period of use in an installation. In this respect, it will be understood that the connecting means of the present invention involves a most decided advance in the art in that it eliminates entirely the necessity for strengthening ribs, webs, insert and similar reinforcing means heretofore found necessary in the provision of the connecting means of such knobs and similar articles of manufacture.

With a knob or other object formed with a recess 13 in the manner aforesaid, there is provided a spring holding clip device 20 which is of such design as to be received within said recess in frictional bearing engagement with the side walls thereof under continuous spring tension. The said spring collar device 20 is constructed of any suitable material, preferably a strip of sheet metal such as spring steel which is readily worked by suitable bending and forming operations to the desired shape and size to be received in assembled relation in the said recess in the knob or other part to provide bearing surfaces presenting a socket for receiving a cooperating shaft, rod or spindle in a completed installation, as presently to be described.

A preferred type of the spring holding clip is formed as shown in Fig. 3 to comprise a plurality of resilient spring arms 21 the outer ends of which present substantial cam shoulders 22 designed to rigidly hold the clip in assembled relation in the recess in the knob or other part to be attached by frictionally engaging the side walls of such recess at suitable spaced points. The inner ends of said spring arms are formed into substantial bearing surfaces 23 presenting a socket opening therebetween admirably suited for receiving practically any shape shaft or shaft stem of suitable size whether round, D-shaped, square, flat-sided or otherwise. It will be understood that in the normal untensioned relation of the spring arms 21, the shoulders 22 thereof are spaced slightly more than necessary to be received in the recess in the knob or other part to be attached. Thus when the clip is applied to assembled relation in the recess, the resilient spring arms 21 are compressed as necessary to seat the shoulders 22 against the side walls of the recess in frictional bearing engagement therewith under the expansive force of said spring arms attempting to assume their normal untensioned relation. At the same time the bearing surfaces 23 are urged toward each other to a spacing slightly less than necessary to receive the shaft, in which relation they may be readily wedged apart as necessary by the shaft extremity in order to admit the shaft and maintain the same in applied position under clamping engagement supplied by the expansive force of said spring arms attempting to assume their normal, untensioned relation.

From the foregoing it will be understood that the elements comprising the improved connecting means in the embodiment just described are readily assembled and mounted in an installation simply by compressing the spring holding clip as necessary to permit the shoulders 22 on the spring arms to be received in the recess in the knob or other part to be connected and in frictional bearing engagement with the side walls of such recess; this is readily accomplished by any suitable tool such as a pair of pliers compressing the spring clip until fully received within the recess whereupon the tool is removed and the spring arms allowed to expand to cause the shoulders 23 to seat against the side walls of the recess thereby automatically holding the clip in self retaining position in assembled relation in the knob or other article of manufacture. In this relation, the bearing surfaces 23 present a socket opening adapted for receiving any of several sizes and shapes of shafts as aforesaid to frictionally and grippingly hold the same in clamping engagement under continuously effective spring tension. This resilient spring gripping relation of the bearing surfaces with the shaft is of considerable importance inasmuch as the spring clip not only is adapted to receive several sizes of shafts but also is admirably suited to compensate for irregularities and manufacturing variations in the shaft stem which of course must be expected in mass production. Thus there is seldom any necessity for special shaping operations of the usual number of shafts or shaft stems which do not properly fit the socket openings provided as in similar connections heretofore known which in practically every instance, require that the shaft be of precise, exact size for obtaining an effective connection of the shaft and knob or other part to be attached.

The shaft itself designated generally 25 is usually plain round rod material but of course may be of any other selected stock so long as it is provided with a stem 26 preferably of substantial D-shape readily adapted to be received in the socket opening presented by the bearing surfaces 23 in clamping engagement therewith substantially as shown in Fig. 3. Naturally, round stock is the most desirable since it is the cheapest and requires only a simple, expeditious cutting or grinding operation along one side to provide a cut-away portion forming the desired, substantially D-shaped stem 26 having a shoulder 27 at the inner end thereof.

Usually the spring holding clip is first applied to assembled relation in the recess of the knob or other part to be attached, thereafter receiving the shaft in a completed installation as aforesaid. In certain instances, it is a more expeditious procedure first to position the spring holding clip onto the shaft stem as shown in Fig. 1 and then apply the assembly to the recess in the knob or other part; and inasmuch as the shoulder 27 on the shaft engages the edges of the clip in the area of the bearing surfaces 23 as shown in Fig. 4, this method of assembly may be accomplished with a minimum of effort, simply by pressing the respective parts toward each other as necessary.

In any event, the stem 26 provided on the shaft is readily introduced into the socket opening presented by the bearing surfaces 23 of the spring arms of the clip. To facilitate such application of the shaft stem, the same may be provided with a tapered extremity whereupon it is easily forced between said bearing surfaces and advanced axially of the knob body to fully assembled position with the shoulder 27 thereof in abutting relation with adjacent edges of the clip in the area of the bearing surfaces substantially as shown in Fig. 4, in which relation the rigidity of the connection is materially enhanced. Thus, in applying the shaft stem to the socket opening presented by the bearing surfaces 23 of the spring holding clip, such bearing surfaces exert a resilient spring gripping and clamping action against the shaft to maintain the same in connected engagement with the knob, handle or other article of manufacture attached thereto.

Since the shaft stem is preferably of substantially D-shaped cross-section comprising a flat side face against which at least one of the bearing surfaces 23 of the clip is disposed in abutting relation as shown in Fig. 3, the respective parts of the connection are held positively against relative rotative as well as relative axial movement at all times. It will be appreciated therefore, that the connecting means of the present invention comprising a spring holding clip operating in the manner and for the purpose just described is admirably suite for use as the means for securing a knob, handle or the like to be detachably mounted onto the projecting stem of a control shaft passing through a panel P, Fig. 4, for example, of a radio apparatus or a stove burner unit in which the shaft is not readily accessible from the rear side of the panel for the use of set screws and similar fastenings requiring tools for securing the knob thereto.

It will be further appreciated that the connecting means of the present invention marks a decided advance in the art in that various articles of manufacture may be mounted in an installation without the use of webs, inserts and similar reinforcing means and in such a manner that a knob, handle and other part is held positively on the shaft against relative rotative as well as relative axial movement at all times under continuously effective spring tension inherent in the construction of the spring holding clip device.

In this relation it will be understood that the larger portion of the thrust and strain taking place in the connnection incident to turning movements and other operations, is taken up more particularly by the bearing surfaces and spring arms of the clip and is not transmitted to the relatively fragile material of the knob body or the like wherefore possibility of chipping or cracking of the plastic material thereof is greatly minimized and practically completely eliminated.

As illustrated in Fig. 5, the embodiment of the invention just described is equally adaptable for use for as a means for connecting any article of manufacture to a shaft simply by drilling a recess at one end of the article and applying a spring holding clip to frictional bearing engagement in such recess, whereupon the cooperating shaft may be connected thereto substantially in the manner set forth with reference to Figs. 1–4 inclusive. Thus an article of manufacture such as a piston like plunger 15 or like operating member may be readily provided with a drill hole recess 16 into which the spring holding clip 20 may be press-fitted for receiving the extremity of a common round shaft 28, for example. In this respect the instant connecting means is most advantageous in that the spring holding clip is admirably suited for operatively receiving any of several sizes of shafts or to compensate for irregularities and manufacturing variations in such shafts. This of course is most important in mass production inasmuch as the shaft in many such installations is often a relatively long, unwieldly member and it has heretofore been a costly, time-consuming proposition whenever the usual number of shafts in a supply did not properly fit and had to be set up for a special dressing operation merely to form the extremities thereof in the required shape and size for proper engagement in the socket openings in their cooperating parts.

Figs. 6–8 inclusive show a further embodiment of the invention in which the number of the parts of the connection and the assembly and operation thereof in an installation is substantially similar to that described with reference to Figs. 1 to 4 inclusive. However, this form of connecting means contemplates the use of a spring holding clip which is much simpler in construction and readily designed as necessary to provide a socket opening for receiving a shaft or shaft stem of any selected configuration. Thus, as shown in Fig. 6, this form of the clip may be readily constructed from a small, inexpensive section of sheet metal, the mid-portion of which is bent to provide bearing surfaces 33 from which extend spring arms 31 having their ends bent as necessary to provide shoulders 32 for frictional bearing engagement with the side walls of the recess in the part to which the clip is applied preparatory to the mounting thereof in a completed installation. As shown in Fig. 7, in order to provide for the desired non-rotatable, fixed relation of a round shaft 35 in the socket opening presented by the bearing surfaces 33 of the spring holding clip thus provided, such bearing surfaces are shaped to correspond therewith and otherwise designed for engaging the shaft around substantially its entire periphery to afford the greatest possible amount of frictional, gripping contact therewith. Referring to Fig. 8, it will be understood that the shaft may be of any other cross-section such as half-round, D-shaped or other flat sided configuration in which event, the bearing surfaces 33' of the spring holding clip are preferably shaped in accordance with the cross-section of the D-shaped shaft 36 to include a flat bearing surface 34 against which the flat face of the shaft is designed to abut in non-rotatable engagement in assembled relation in the socket opening presented by said bearing surfaces.

Figs. 9 and 10 illustrate still another form of the invention comprising the usual number of simple, component parts which may be readily embodied in the connecting means for a knob, handle or the like to operate in a manner substantially similar to that described with reference to Figs. 1 to 4 inclusive. In the case of a relatively large dial handle, panel knob or similar plastic part, it is often desirable to employ a connecting hub of considerably smaller size in order to effect a saving in the amount of material required therefor, and also to permit the use of a relatively small spring holding clip. Accordingly, as illustrated in Fig. 10, the plastic dial handle 45 or other article of manufacture is provided with a recess on its underface by means of a simple form of integral connecting hub 46 which of course may be formed at very low cost in the same molding operation for the knob or handle itself. Thus, it is expedient to employ a relatively small spring holding clip 40, embodying the characteristics and essential features of construction of the previously described forms of spring holding clips. This form of the spring clip, Fig. 9, is constructed from a small, inexpensive section of sheet metal which is bent at the substantial midportion thereof to provide the usual bearing surfaces 43 from which extend the spring arms 41 suitably bent to form the shoulders 42 designed for frictional bearing engagement in assembled relation in the recess 47 provided by the connecting hub 46 as illustrated in Fig. 10. In the event the cooperating shaft has a flat side face, the bearing surfaces 43 of the clip are designed in accordance with the contour of the shaft to present a socket opening having a flat side wall against which the flat face of the shaft may be disposed in firm, rigid, non-rotatable abutting relation. Thus as shown in Fig. 9, one of the bearing surfaces is provided with a corrugation 44 which together with the flat face of the opposed bearing surface presents a substantially D-shaped socket opening for snugly receiving a D-shaped shaft 48, Fig. 10, to maintain the same in connected engagement against relative rotative as well as relative axial movement. It will be understood that in this form of the connecting means, even though a connecting hub is employed for providing the recess receiving the spring holding clip, said clip is so designed that the spring arms 41 and shoulders 42 thereof engage the side walls of the recess throughout practically its entire surface such that there is no localized binding or wedging action as would cause cracking, splitting or breaking of said connecting hub.

This form of the connecting means comprising a connecting hub may of course be employed in any installation for a knob, handle or the like, and if desired, may embody the preferred form of clip illustrated in Figs. 1 to 4 inclusive. Accordingly, as illustrated in Fig. 11, a knob, handle, or the like 55 may be provided in any suitable manner with a central connecting hub 56 having a cylindrical or other recess 57 into which is assembled a relatively small clip 20 of the construction described with reference to the embodiment of the invention represented in Figs. 1 to 4 inclusive and presenting a socket opening for receiving a shaft 58.

In view of the foregoing description, it is to be noted that the connecting means of the instant invention, in any embodiment, provides a most simple, inexpensive construction, making for a highly practical form of connecting arrangement by which a knob or other article of manufacture may be easily and quickly assembled onto a shaft or the like by means of a spring holding clip device automatically gripping the shaft in clamping engagement under continuously effective spring tension against relative rotative as well as relative axial movement. As respects relative axial movement, even greater efficiency and a substantially positive locked connection may be obtained simply by providing coengaging teeth, ribs, knurling, etc. on adjacent cooperating surfaces of the shaft stem and spring clip in any embodiment of the invention.

It will be further appreciated that the improved connections of the present invention are such as to especially be suited for use with articles formed of plastic compositions and other fragile materials inasmuch as the spring collar holding clip employed in any embodiment is so designed as to take practically the entire thrust and strain set up by the shaft thereby practically eliminating any possibility of splitting or breaking of the plastic knob, handle or other part when employed either for turning operations as in a rotary panel knob or as a push-pull operating device.

Though the description and drawings refer to the invention as incorporated in a panel knob such as used in radio apparatus, for example, it will be understood that the instant connecting means is equally applicable wherever any article of manufacture is to be secured to a shaft, rod, spindle, etc., or in any installation in which an operating member is to be mounted by sliding over the end of a shaft or applied to a shaft stem to effect axial movements thereto or for the purpose of transmitting or receiving a relatively small torque.

And while the invention has been described in detail with specific examples, such examples are intended as illustrations only, since it will be apparent to those skilled in the art that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. In a connection for attaching a shaft to an operating member or the like, a fastening member comprising a spring holding clip providing a socket opening for the shaft in the form of cooperating bearing surfaces adapted to grip the shaft in clamping engagement therewith, said clip including attaching means in the form of resilient spring arms extending from said bearing surfaces, said spring arms being provided with shoulders designed for frictional bearing engagement with the side walls of a recess in said operating member, said bearing surfaces of the spring arms resiliently engaging said shaft in holding said shaft and operating member in connected engagement.

2. In a connection for attaching a shaft to a knob, handle or other body member provided with a recess, a connecting clip device comprising spring arms seated in said recess, said spring arms being provided in the manner of return bends providing shoulders designed for cam bearing engagement with the side walls of said recess to seat the clip therein with said spring arms under compression, said clip including cooperating bearing surfaces formed in continuation of said spring arms and presenting a socket opening for receiving the shaft, said bearing surfaces being adapted for clamping engagement with said shaft to maintain the same in assembled relation with said body member under the compressive force of said spring arms.

3. In a connection for attaching an operating member or the like to a shaft having a flat side face, a fastening member comprising a spring holding clip having a plurality of bearing surfaces adapted to grip the shaft in clamping engagement with one of said bearing surfaces in abutting relation with the flat side face of said shaft, and attaching means in the form of resilient spring arms extending from said bearing surfaces, said spring arms being provided with shoulders designed for frictional bearing engagement in a recess in said operating member, said bearing surfaces of the spring arms resiliently engaging said shaft in holding said shaft and operating member in connected engagement against relative rotative and relative axial movement.

4. In a connection for attaching a shaft to a knob, handle or other body member provided with a recess, a connecting clip device comprising spring arms seated in said recess, each said spring arms being in the form of a substantial U-shaped return bend providing shoulders designed for cam bearing engagement with the side walls of said recess to seat the clip therein with said spring arms under compression, said clip including cooperating bearing surfaces formed in continuation of said spring arms and presenting a socket opening for receiving the shaft, said bearing surfaces being adapted for clamping engagement with said shaft to maintain the same in assembled relation with said body member under the compressive force of said spring arms.

5. In connection for attaching an operating member or the like to a shaft, a spring holding clip comprising a strip of metal having a bend intermediate its ends providing a pair of bearing surfaces adapted to grip the shaft in clamping engagement therewith, one of said bearing surfaces having a spring arm extending therefrom designed to be compressed in frictional bearing engagement in a recess in said operating member, said bearing surfaces of the clip holding said shaft and operating member in connected engagement under the compressive force of said spring arm.

6. In a connection for attaching a shaft to a knob, handle or other body member provided with a recess, a connecting clip device seated in said recess under compression, said clip comprising a pair of spring arms in compressed frictional bearing engagement with the side walls of said recess and a pair of cooperating bearing surfaces formed by return bends in continuation of said spring arms, said bearing surfaces being adapted to grip the shaft in clamping engagement therewith in holding the said shaft and body member in connected engagement under continuously effective spring force exerted by said compressed spring arms.

7. In a connection for attaching a shaft having a flat side face to a knob, handle or other body member provided with a recess, a connecting clip device seated in said recess under compression, said clip comprising a spring arm in compressed frictional bearing engagement with the side wall of said recess and a pair of cooperating bearing surfaces formed by a return bend in continuation of said spring arm and presenting a socket opening for receiving the shaft, one of said bearing surfaces being disposed in non-rotatable abutting relation with the flat side face of said shaft, said bearing surfaces otherwise seating said shaft in assembled relation in the recess in said body member in clamping engagement therewith under the compressive force of said spring arm.

8. In a connection for attaching a shaft to an operating member provided with a recess, a clip comprising a strip of metal having a plurality of bends intermediate its ends providing a plurality of outer shoulders spaced by inner bearing surfaces, said outer shoulders being designed for frictional bearing engagement with the peripheral wall of said recess in the operating member under compression, and said inner bearing surfaces of the clip being adapted to resiliently engage said shaft in holding said shaft and operating member in connected engagement under the force of said outer shoulders seated under compression in said recess in the operating member.

9. In a connection for attaching a shaft having a flat side face to an operating member provided with a recess, a clip comprising a strip of metal having a plurality of bends intermediate its ends providing a plurality of outer shoulders spaced by inner bearing surfaces, said outer shoulders being designed for frictional bearing engagement with the peripheral wall of said recess in the operating member under compression, and said inner bearing surfaces being adapted to resiliently engage said shaft in holding said shaft and operating member in connected engagement under force of said outer shoulders seated under compression in said recess in the operating member, one of said bearing surfaces being disposed in nonrotatable abutting relation with the flat side face of said shaft to hold the same against relative rotative and relative axial movement.

GEORGE A. TINNERMAN.